US011824787B2

(12) United States Patent
Jiang

(10) Patent No.: US 11,824,787 B2
(45) Date of Patent: Nov. 21, 2023

(54) METHOD AND APPARATUS FOR NODE SPEED LIMITING, ELECTRONIC DEVICE AND STORAGE MEDIUM

(71) Applicants: Beijing Kingsoft Cloud Network Technology Co., Ltd., Beijing (CN); Beijing Kingsoft Cloud Technology Co., Ltd., Beijing (CN)

(72) Inventor: Ran Jiang, Beijing (CN)

(73) Assignees: Beijing Kingsoft Cloud Network Technology Co., Ltd, Beijing (CN); Beijing Kingsoft Cloud Technology Co., Ltd., Beijing (CN)

( * ) Notice: Subject to any disclaimer, the term of this patent is extended or adjusted under 35 U.S.C. 154(b) by 9 days.

(21) Appl. No.: 17/626,352

(22) PCT Filed: Sep. 18, 2020

(86) PCT No.: PCT/CN2020/116095
§ 371 (c)(1),
(2) Date: Jan. 11, 2022

(87) PCT Pub. No.: WO2021/057607
PCT Pub. Date: Apr. 1, 2021

(65) Prior Publication Data
US 2022/0263768 A1    Aug. 18, 2022

(30) Foreign Application Priority Data

Sep. 29, 2019   (CN) .......................... 201910935647.6

(51) Int. Cl.
*H04L 47/267*   (2022.01)
*H04L 61/4511*  (2022.01)
*H04L 43/065*   (2022.01)

(52) U.S. Cl.
CPC .......... *H04L 47/267* (2022.05); *H04L 43/065* (2013.01); *H04L 61/4511* (2022.05)

(58) Field of Classification Search
CPC . H04L 47/267; H04L 43/065; H04L 61/4511; H04L 47/20; H04L 61/30;
(Continued)

(56) References Cited

U.S. PATENT DOCUMENTS

2009/0180430 A1    7/2009  Fadell
2017/0187768 A1*   6/2017  Huang .................... H04L 65/80
(Continued)

FOREIGN PATENT DOCUMENTS

CN    101702669 A    5/2010
CN    105530202 A    4/2016
(Continued)

OTHER PUBLICATIONS

First Office Action of corresponding IN application No. 202227000349 dated Jun. 15, 2022, all pages cited in its entirety.
(Continued)

*Primary Examiner* — Yaotang Wang
(74) *Attorney, Agent, or Firm* — Burr & Forman LLP

(57) ABSTRACT

Embodiments of the present application relate to the technical field of computers, and provides a method and an apparatus for node speed limiting, an electronic device and a storage medium. The method comprises: receiving bandwidth data reported by a node under a target domain name, wherein the bandwidth data comprises the number of node connections and a node bandwidth, and the number of node connections is the number of connected devices in the node; and calculating a bandwidth quota for the node based on the bandwidth data and a quota upper limit for the target domain name.

13 Claims, 4 Drawing Sheets

(58) Field of Classification Search
CPC ... H04L 47/786; H04L 47/787; H04L 47/822; H04L 47/78; H04L 47/765
See application file for complete search history.

(56) References Cited

U.S. PATENT DOCUMENTS

2020/0328986 A1* 10/2020 He .......................... H04L 67/63
2021/0367902 A1* 11/2021 Zhuang ................ H04L 47/785

FOREIGN PATENT DOCUMENTS

| CN | 109361622 A | 2/2019 |
| CN | 109412977 A | 3/2019 |
| CN | 105530202 B | 4/2019 |
| CN | 110048968 A | 7/2019 |
| CN | 110519183 A | 11/2019 |
| EP | 3748925 A1 | 12/2020 |
| EP | 3866419 A1 | 8/2021 |
| JP | 2004320159 A | 11/2004 |
| JP | 2016541183 A | 12/2016 |
| JP | 2021500834 A | 1/2021 |
| WO | 2018112895 A1 | 6/2018 |

OTHER PUBLICATIONS

Extended European Search Report of corresponding EP application No. 20868442.3 dated Jun. 24, 2022, all pages cited in its entirety.
First Office Action of corresponding JP application No. 2022-501137 dated May 23, 2023, all pages cited in its entirety.

* cited by examiner

METHOD AND APPARATUS FOR NODE SPEED LIMITING, ELECTRONIC DEVICE AND STORAGE MEDIUM

The present application claims the priority of a Chinese patent application No. 201910935647.6, filed in China National Intellectual Property Administration on Sep. 29, 2019, and entitled "Method and Apparatus for Node Speed Limiting, Electronic Device and Storage Medium", which is incorporated herein by reference in its entirety.

TECHNICAL FIELD

The present application relates to the technical field of computers, in particular to a method and an apparatus for node speed limiting, an electronic device and a storage medium.

BACKGROUND

At present, there is a growing demand for the Internet in various fields. In order to ensure the normal operation of the Internet, it is necessary to limit the speed of each node under the same domain name.

The current method of limiting the speed of each node is to set a bandwidth quota for each node, and when the bandwidth of a node exceeds a bandwidth quota of the node, the electronic device can limit the speed of the node so that the bandwidth of the node is less than the bandwidth quota.

However, as the bandwidth quota set by the electronic device for each node is a fixed value, which will lead to the speeds of nodes with a large amount of traffic to be continuously limited, and the bandwidths of nodes with a small amount of traffic cannot easily reach the bandwidth quota, thus the bandwidth quota set for each node is not applicable to the bandwidth of each node.

SUMMARY

In the first aspect, a method for node speed limiting is provided, which is applied to an electronic device. The method includes: receiving bandwidth data reported by a node in a target domain name, wherein the bandwidth data includes the number of node connections and a node bandwidth, and the number of node connections is the number of connected devices in the node; calculating a bandwidth quota for the node based on the bandwidth data and a quota upper limit for the target domain name, wherein the bandwidth quota is the maximum available bandwidth of the node after a speed limiting policy is enabled.

In the second aspect, an apparatus for node speed limiting is provided, which is applied to an electronic device. The apparatus includes a receiving module, configured for receiving bandwidth data reported by a nodes under a target domain name, wherein the bandwidth data includes the number of node connections and a node bandwidth, and the number of node connections is the number of connected devices in the node; and a calculating module, configured for calculating the bandwidth quota for the node based on the bandwidth data and a quota upper limit for the target domain name, wherein the bandwidth quota is the maximum available bandwidth of the node after a speed limiting policy is enabled.

In the third aspect, an electronic device is provided, which includes a processor, a communication interface, a memory and a communication bus, wherein the processor, the communication interface and the memory are communicated with each other through the communication bus; the memory is configured for storing a computer program; the processor is configured for implementing the method steps described in the first aspect when executing the program stored in the memory.

In the fourth aspect, a computer-readable storage medium is provided, having stored thereon a computer program which, when executed by a processor, causes the processor to perform the method steps described in the first aspect above.

In the fifth aspect, a computer program product is provided, including instructions which, when executed on a computer, causes the computer to perform the method described in the first aspect above.

In the sixth aspect, a computer program is provided which, when executed on a computer, causes the computer to perform the method described in the first aspect above.

With the solution according to the embodiment of the present application, the electronic device can receive bandwidth data reported by a node under a target domain name, and calculate bandwidth quota for the node based on the bandwidth data and a quota upper limit for the target domain name.

Of course, it is not necessary for any product or method according to the present application to achieve all the above advantageous at the same time.

BRIEF DESCRIPTION OF THE DRAWINGS

In order to more clearly describe the technical solution of the embodiments of the application and the prior art, drawings used in the embodiments and the prior art will be briefly described below. Obviously, the drawings described below are for only some embodiments of the present application, one of ordinary skills in the art can also obtain other drawings based on the drawings herein without any creative efforts.

DETAILED DESCRIPTION

In order to make the purpose, technical solutions and advantages of the present application clearer, the present application will be further described in detail with reference to the attached drawings and embodiments. Obviously, the described embodiments are only some of the embodiments of the present application instead of all of them. Based on the embodiments in the present application, all other embodiments obtained by those of ordinary skill in the art without creative efforts shall fall within the protection scope of the present application.

An embodiment of the present application provides a method for node speed limiting, which may be applied to an electronic device. The electronic device may allocate bandwidth quotas for each node under at least one domain name.

In an embodiment of the present application, the electronic device may be a Content Delivery Network (CDN) central server.

The CDN central server may manage multiple domain names, and there may be at least one node under each domain name. Each node may be a server or a collection of multiple servers, and the server in each node may be connected to at least one terminal device. In this way, the CDN central server may manage each terminal device connected with each node through the server in each node.

Figure 1A:
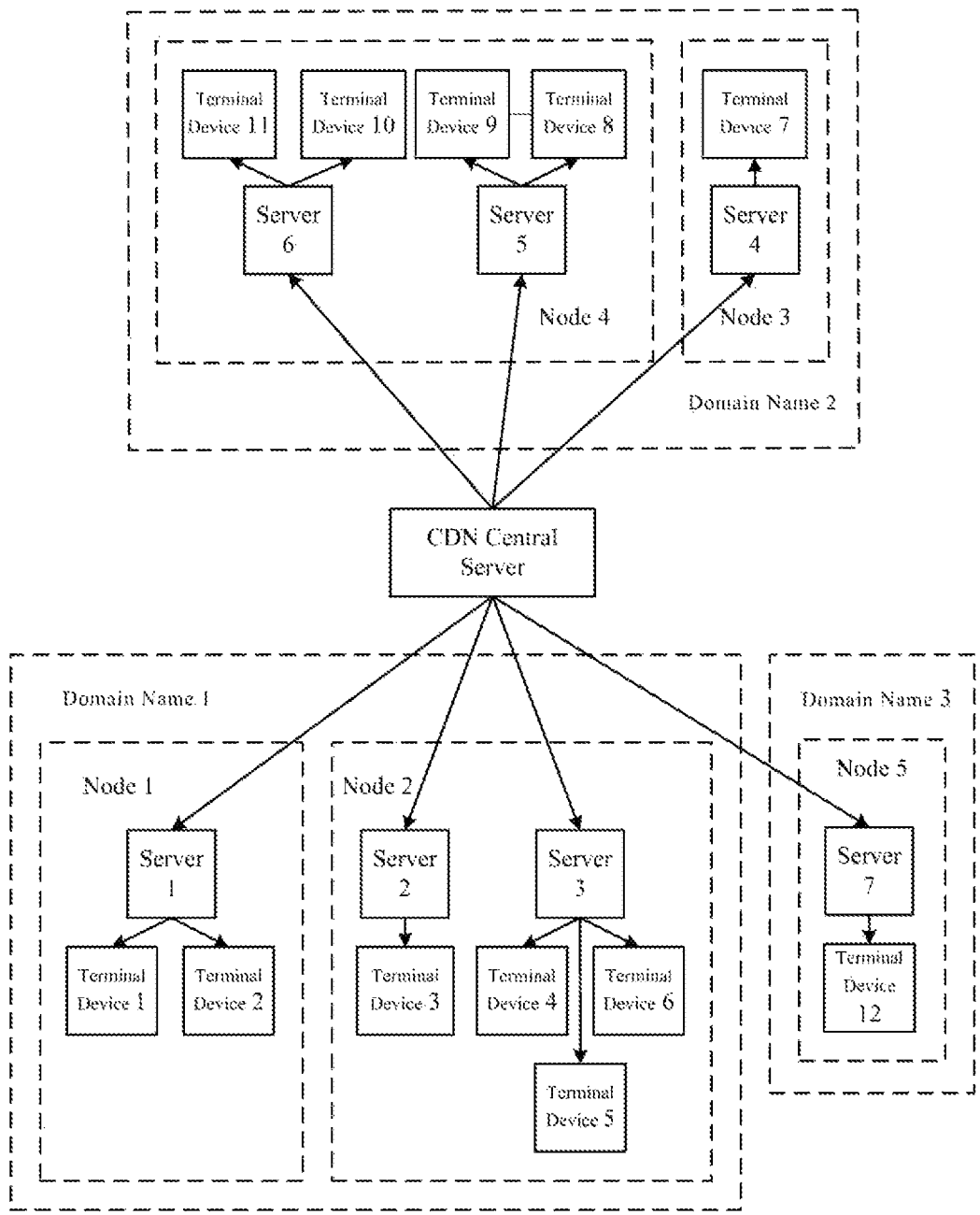
FIG. 1(a) is a schematic structural diagram of a content delivery network.

For example, as shown in FIG. 1(a), it is a schematic structural diagram of a content delivery network. The CDN central server may manage domain name 1, domain name 2 and domain name 3. There are node 1 and node 2 under domain name 1, node 3 and node 4 under domain name 2 and node 5 under domain name 3. The node 1 is a server 1, which is connected to terminal device 1 and terminal device 2. The node 2 is a collection of server 2 and server 3, wherein the server 2 is connected to terminal device 3, and the server 3 is connected to terminal device 4, terminal device 5 and terminal device 6. The node 3 is a server 4, which is connected to terminal device 7. The node 4 is a collection of server 5 and server 6, wherein the server 5 is connected to terminal device 8 and terminal device 9, and the server 6 is connected to terminal device 10 and terminal device 11. The node 5 is a server 7, which is connected to terminal device 12.

It should be noted that the above-mentioned FIG. 1(a) is only an example of the structure of the content delivery network without any limitation, and the specific structure of the content delivery network is not limited in the embodiment of the present application.

In the embodiment of the present application, the electronic device can realize the purpose of managing the nodes by allocating bandwidth quotas to the nodes (i.e., limiting the speed of the nodes), and further realize the purpose of managing each terminal device connected in the nodes. The bandwidth quota is the upper limit of the bandwidth allocated by the electronic device to each node, and each node may limit the speed of the terminal device connected thereto according to the bandwidth quota.

Figure 1B:
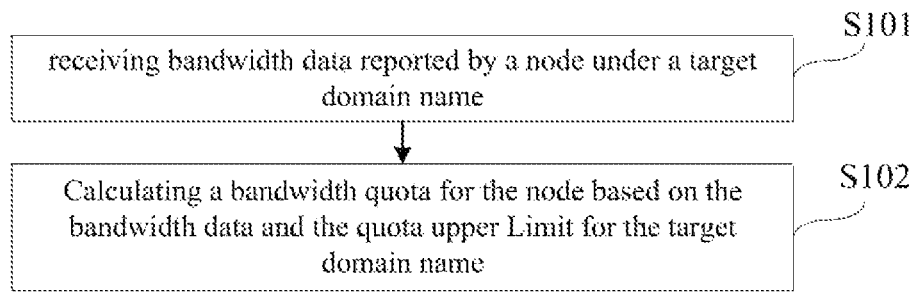
FIG. 1(b) is a schematic flow diagram of a method for node speed limiting according to an embodiment of the present application.

A method for node speed limiting according to the embodiment of the present application will be described in detail with reference to specific implementations below. As shown in FIG. 1(b), the method for node speed limiting includes the following steps:

S101: receiving bandwidth data reported by a node under a target domain name.

The above bandwidth data includes the number of node connections and a node bandwidth, wherein the number of node connections is the number of connected devices in the node, and the node bandwidth is the sum of bandwidth used by nodes and devices in the nodes.

It should be noted that the number of devices in the node is the number of terminal devices connected to the servers included in the node, that is, the number of terminal devices connected in the node. When a node is one server, the number of node connections of this node is the number of terminal devices connected to the server. When a node is a collection of multiple servers, the number of node connections of this node is the sum of the number of terminal devices connected to each of the multiple server in the node.

In addition, the aforementioned target domain name is any domain name managed by the electronic device, and at least one node may exist under the target domain name. The electronic device may receive the bandwidth data reported by each node under the target domain name.

When the node reporting bandwidth data is one server, in the step S201, the electronic device receives the bandwidth data reported by the server.

Accordingly, when the node reporting bandwidth data is a collection of multiple servers, there may be a management server in the multiple servers for managing the multiple servers. In step S101, the electronic device receives the bandwidth data reported by the management server, that is, receives the sum of the number of terminal devices connected to the multiple servers and the sum of the bandwidth used by the multiple servers and each of the terminal devices connected to the multiple servers.

Alternatively, the multiple servers may report their own bandwidth data to the electronic device at the same time, wherein the bandwidth data reported by each server includes the number of terminal devices connected to the server and the sum of the bandwidth used by the server and each terminal device connected to the server. In this way, after receiving the bandwidth data reported by each of the multiple servers, the electronic device may determine the bandwidth data of the node based on the multiple bandwidth data, that is, determine the sum of the number of terminal devices connected to the multiple servers and the sum of the bandwidth used by the multiple servers and each terminal device connected to the multiple servers.

In addition, in an embodiment of the present application, in step S101, the node may also send a bandwidth quota query request while reporting bandwidth data. Accordingly, the electronic device may receive the bandwidth quota query request sent by the node while receiving the bandwidth data reported by the node under the target domain name.

In an embodiment of the present application, a node may carry the bandwidth data and the bandwidth quota query request in one message, or may carry the bandwidth data and the bandwidth quota query request in different messages respectively, that is, report the bandwidth data in one message and send the bandwidth quota query request in another message.

In practical applications, each node under the target domain name may report the bandwidth data and send the bandwidth quota query request every a reporting period (for example, every 5 seconds). One reporting period of one of the nodes is taken as an example for description in an embodiment of the present application, and the method for each node to report the bandwidth data and query the bandwidth quota in each reporting period may be the same.

S102: calculating a bandwidth quota for the node based on the bandwidth data and the quota upper limit for the target domain name.

The bandwidth quota is the maximum available bandwidth of the node after a speed limiting policy is enabled.

Wherein, each node under the target domain name may report its own bandwidth data once every a reporting period (for example, every 5 seconds), and then the electronic device may calculate the bandwidth quota for each node based on the bandwidth data reported by each node.

Furthermore, after calculating the bandwidth quota for the node, the electronic device may allocate the calculated bandwidth quota to the node, so that the electronic device may limit the speed of the node according to the bandwidth quota. That is, when the sum of the bandwidth used by the node and devices in the node exceeds the calculated bandwidth quota, the speed of the node is limited.

When a node is one server, the electronic device may allocate the calculated bandwidth quota for the node to the server, so that when the bandwidth used by the server exceeds the bandwidth quota allocated by the electronic device to the server, the electronic device may limit the speed of the node, that is, the electronic device may limit the speed of the server.

When a node is a collection of multiple servers, the electronic device may allocate the calculated bandwidth quota for the node to each server in the node. The electronic device may allocate the bandwidth quota for the node to each server according to any allocation principle. For example, the electronic device may allocate the bandwidth quota for the node to each server according to the load situation of each server. For example, the electronic device may allocate the bandwidth quota for the node to each server according to the current time and the predetermined time when the load of each server is relatively large. These are all reasonable.

Furthermore, when a node is a collection of multiple servers, when the bandwidth used by a certain server exceeds the bandwidth quota allocated by the electronic device to the server, the electronic device may limit the speed of the node, that is, the electronic device may limit the speed of the server. When there is no server whose bandwidth exceeds the bandwidth allocated by the electronic device, and the sum of the bandwidth used by the node and the devices in the node exceeds the bandwidth quota calculated above, the electronic device may limit the speed of the node, that is, the electronic device may limit the speed of at least one of the servers.

In practical applications, there may be multiple nodes under the target domain name, and each node may report its own bandwidth data every a reporting period. Since each node reports the bandwidth data in a discrete form, the electronic device may cache the bandwidth data reported by each node, and calculate the bandwidth quota for the bandwidth data reported by each node every a calculation period, that is, calculate the bandwidth quota for each node. For example, each node under the target domain name reports bandwidth data once every 5 seconds, but the time when each node reports bandwidth data may be different. For example, node A reports bandwidth data at 12 seconds and node B reports bandwidth data at 12.3 seconds, so the electronic device may start the process of calculating a bandwidth quota once every one second.

When the electronic device receives the bandwidth data reported by each node under the target domain name, the electronic device may cache the bandwidth data and calculate the bandwidth quota corresponding to the bandwidth data in the next calculation period, that is, calculate the bandwidth quota for each node.

In each calculation period, the electronic device may calculate the bandwidth quota for the nodes reporting the cached bandwidth data based on the cached bandwidth data in this calculation period.

The embodiment of the present application takes the method of calculating the bandwidth quota for one node in one calculation period as an example for description, and the method of calculating the bandwidth quota may be the same for each node.

The electronic device may set a quota upper limit for the target domain name, and the quota upper limit is used to limit the speed of each node under the target domain name.

With the solution according to the embodiments of the present application, the electronic device can receive the bandwidth data reported by a node under the target domain name, and calculate the bandwidth quota for the node based on the bandwidth data and a quota upper limit for the target domain name. In this way, since different nodes have different bandwidth data, the electronic device can calculate the bandwidth quota for each node separately for each node based on the bandwidth data of each node under the target domain name. Therefore, the bandwidth quota for each node calculated by the electronic device can accurately match the bandwidth condition of each node, so that the electronic device can more accurately allocate the bandwidth quota to each node under the target domain name.

In one embodiment of the present application, for S102, i.e., calculating the bandwidth quota for the node based on the bandwidth data and the quota upper limit for the target domain name, the embodiments of the present application may provide two possible manners for calculating the bandwidth quota.

Manner 1: the electronic device may determine total allocatable quota and calculate the bandwidth quota for the node based on the total allocatable quota and bandwidth data.

Wherein, the total allocatable quota is the product of the quota upper limit for the target domain name and a first preset ratio.

In addition, the specific value of the above-mentioned first preset ratio is not limited in the embodiment of the present application. The first preset ratio may be determined based on the amount of the traffic except the traffic of each node under the target domain name in actual application, so as to ensure the quantity transmission of various types of information under the target domain name and the smooth operation of various tasks. For example, the above-mentioned first preset ratio is determined based on the amount of traffic required by the electronic device to send control management instructions to each node under the target domain name.

For example, the above-mentioned first preset ratio may be 98.5%, and if the quota upper limit for the target domain name is X, the total allocatable quota is 0.985X. For another example, the above-mentioned first preset ratio may be 98%, and if the quota upper limit for the target domain name is X, the total allocatable quota is 0.98X. Of course, the first preset ratio may also be other specific values, such as 99%, 97.5%, which are all reasonable.

After determining the total allocatable quota, the electronic device may calculate bandwidth quotas for the node based on the total allocatable quota and bandwidth data.

> The bandwidth quota for the above node=the total allocatable quota*(a second preset ratio*the number of node connections/the total number of node connections under the target domain name+a third preset ratio*the node bandwidth/the total bandwidth of the nodes under the target domain name).

The total number of node connections under the target domain name is the sum of the number of devices connected by all nodes under the target domain name, and the total bandwidth of the nodes under the target domain name is the sum of the bandwidth of all nodes under the target domain name.

The sum of the number of devices connected to all nodes under the target domain name is the sum of the number of terminal devices connected to all servers in all nodes under the target domain name.

In addition, the specific values of the second preset ratio and the third preset ratio are not limited in the embodiment of the present application. The second preset ratio and the third preset ratio may be determined based on the number of tasks processed by the terminal devices connected to each node under the target domain name and the amount of traffic required to process these tasks in practical applications, so as to ensure that the terminal devices connected to each node under the target domain name can complete their tasks quickly and smoothly.

The second preset ratio and the third preset ratio may be the same or different, and when the second preset ratio and the third preset ratio are different, the second preset ratio may be greater than the third preset ratio or smaller than the third preset ratio, which are all reasonable.

For example, for node A, assume that the total allocatable quota is Y, if node A is connected to 5 terminals, the number of node connections is 5, and if all nodes under the target domain name are connected to 100 terminals, then the total number of node connections under the target domain name is 100, the second preset ratio is 50%, the node bandwidth is 0.8 Gbps, the total bandwidth of the nodes under the target domain name is 10 Gbps, and the third preset ratio is 50%.

Then the bandwidth quota for node $A=Y*(50\%*5/100+50\%*0.8/10)=0.065Y$.

Because the bandwidth quota for node A is calculated by the electronic device based on the number of node connections and the node bandwidth of node A, the bandwidth quota for node A is a bandwidth quota that meets the bandwidth condition of node A, so that redundant bandwidth resources will not be wasted and insufficient bandwidth will not occur.

For another example, for node B, assume that the total allocatable quota is Z, if node B is connected to 10 terminals, the number of node connections is 10, and if all nodes under the target domain name are connected to 150 terminals, the total number of node connections under the target domain name is 150, the second preset ratio is 60%, the node bandwidth is 1.0 Gbps, the total bandwidth of the nodes under the target domain name is 15 Gbps, and the third preset ratio is 40%.

Then the bandwidth quota for node $B=Z*(60\%*10/150+40\%*1.0/15)=0.067Z$.

Since the bandwidth quota for node B is calculated by the electronic device based on the number of node connections and the node bandwidth of node B, the bandwidth quota for node B is a bandwidth quota that meets the bandwidth condition of node B, so that redundant bandwidth resources will not be wasted and insufficient bandwidth will not occur.

Of course, the above-mentioned second preset ratio and the third preset ratio may also be other specific values, such as 65%, 55%, which are all reasonable.

In practical applications, each node under the target domain name may report bandwidth data once every a reporting period (for example, every 5 seconds) and obtain a bandwidth quota. In this way, the electronic device may allocate a bandwidth quota to each node in real time according to the real-time bandwidth condition of each node, so that the bandwidth quota allocated to each node may have higher accuracy and real-time performance.

Manner 2: if the electronic device does not obtain the bandwidth data reported by each node under the target domain name or the bandwidth data reported by each node is inaccurate, the electronic device may determine the total allocatable quota and calculate average bandwidth quota for the node based on the total allocatable quota.

The average bandwidth quota=the total allocatable quota/the total number of nodes under the target domain name.

In practical applications, if the electronic device does not obtain the bandwidth data reported by each node under the target domain name or the bandwidth data reported by each node is inaccurate, the electronic device may evenly allocate the total allocatable quota for the target domain name to each node under the target domain name. In this way, the bandwidth quota (average bandwidth quota) obtained by each node under the target domain name is equal, so that the bandwidth demands of each node under the target domain name may be met as much as possible.

The electronic device may determine that the acquired bandwidth data reported by each node is inaccurate in various ways, which is not specifically limited in the embodiment of the present invention. For example, there are garbled codes in the bandwidth data reported by each node received by the electronic device, which causes the electronic device to be unable to read the specific content of the bandwidth data. For another example, the node bandwidth in the bandwidth data reported by each node received by the electronic device exceeds the total allocatable quota under the target domain name. These are all reasonable.

In an embodiment of the present application, after S102, i.e., calculating the bandwidth quota for the node based on the bandwidth data and the quota upper limit for the target domain name, the electronic device may also store the bandwidth quota for the node. That is to say, the method for node speed limiting provided in an embodiment of the present application may further include the following steps:

if the bandwidth quota for the node exists in the memory of the central server, the electronic device may update the bandwidth quota for the node to the bandwidth quota obtained by this calculation;

or,

If the bandwidth quota for the node does not exist in the memory of the central server, the electronic device may store the bandwidth quota for the node.

The central server is configured to manage each node under the target domain name.

When the above-mentioned electronic device configured to perform the method for node speed limiting according to the embodiment of the present application is the central server, the electronic device may determine, after calculating the bandwidth quota for a node, whether the bandwidth quota for the node exists in its own memory; if so, the electronic device may update the existing bandwidth quota to the calculated bandwidth quota, otherwise, the electronic device may store the calculated bandwidth quota.

In addition, when the electronic device configured to perform the method for node speed limiting according to the embodiment of the present application is different from the central server, the electronic device may determine, after calculating the bandwidth quota for a node, whether the bandwidth quota for the node exists in the memory of the central server in various ways. For example, the electronic device may send a query request to the central server for querying whether the bandwidth quota for the node exists in the memory of the central server, and receive the query result fed back by the central server.

Furthermore, when it is determined that the bandwidth quota for the node exists in the memory of the central server, the electronic device may send the calculated bandwidth quota to the central server, so that the central server may update the existing bandwidth quota to the bandwidth quota calculated above. Accordingly, when it is determined that the bandwidth quota for the node does not exist in the memory of the central server, the electronic device may send the calculated bandwidth quota to the central server, so that the central server stores the bandwidth quota calculated above.

In an embodiment of the present application, the central server may be a CDN central server.

In an embodiment of the present application, the electronic device may also determine the current domain name bandwidth for the target domain name once every a preset period, and determine whether the current domain name bandwidth is greater than the fourth preset ratio of the quota upper limit for the target domain name.

The current domain name bandwidth is the total real-time bandwidth for the target domain name at the current time. After determining the current domain name bandwidth, the electronic device may determine whether the current domain name bandwidth is greater than the fourth preset ratio of the quota upper limit for the target domain name, and cache the determination result.

If the current domain name bandwidth is greater than the fourth preset ratio of the quota upper limit for the target domain name, it can be demonstrated that the bandwidth usage of the target domain name is large, and then the electronic device needs to perform a speed limitation on the target domain name.

Accordingly, if the current domain name bandwidth is not greater than the fourth preset ratio of the quota upper limit for the target domain name, it can be demonstrated that the bandwidth usage of the target domain name is small, and further, the electronic device does not need to perform a speed limitation on the target domain name.

The specific value of the above fourth preset ratio is not limited in the embodiment of the present application. The fourth preset ratio may be determined based on the bandwidth usage of the target domain name and the load of the target domain name in actual applications, so as to ensure that various tasks in the target domain name may be responded in time.

For example, the above fourth preset ratio may be 90%, 98%, and the like. Of course, the fourth preset ratio may also be other values, which are all reasonable.

The period for the electronic device to determine the current domain name bandwidth may be the period calculated above, that is, the electronic device may determine the current domain name bandwidth for the target domain name while calculating the bandwidth quota for the node in each calculation period.

The electronic device may determine the current domain name bandwidth for the target domain name once every a calculation period, and in each calculation period, the electronic device may determine the current domain name bandwidth for the target domain name. If the calculation period is relatively short (for example, 1 second), the electronic device can determine the current domain name bandwidth in real time.

When the period during which the electronic device determines the current domain name bandwidth for the target domain name once is taken as a calculation period, the process of determining the current domain name bandwidth for the target domain name by the electronic device will be synchronized with the process of determining the bandwidth quota for the node by the electronic device. That is, the electronic device may determine the current domain name bandwidth once every time it determines the bandwidth quota for the node.

Accordingly, when the period during which the electronic device determines the current domain name bandwidth is different from the calculation period, the process of determining the current domain name bandwidth by the electronic device will be not be synchronized with the process of determining the bandwidth quota for the node by the electronic device.

In practical applications, regardless of whether the process of determining the current domain name bandwidth by the electronic device and the process of determining the bandwidth quota for the node by the electronic device are synchronous or asynchronous, the effect of determining the current domain name bandwidth in real time can be achieved.

Therefore, in the embodiment of the present application, there is no limitation on whether the electronic device performs the above two processes synchronously or asynchronously.

In an embodiment of the present application, when the electronic device receives the bandwidth quota query request sent by the node, the electronic device may obtain the latest determination result of whether the current domain name bandwidth is greater than the fourth preset ratio of the quota upper limit for the target domain name.

If the determination result indicates that the current domain name bandwidth is greater than the fourth preset ratio of the quota upper limit for the target domain name, the electronic device may send the stored bandwidth quota for the node to the node.

Accordingly, if the determination result indicates that the current domain name bandwidth is not greater than the fourth preset ratio of the quota upper limit for the target domain name, the electronic device may send a no-speed-limiting instruction to the node.

For example, a node may report the bandwidth data and a bandwidth quota query request every 5 seconds (every a reporting period). During the time interval between the time when the node reports bandwidth data for the a-th time and the time when the node reports bandwidth data for the (a+1)-th time, the electronic device will calculate and store, based on the bandwidth data reported by the node for the a-th time, the bandwidth quota for the bandwidth data reported by the node for the a-th time. When the node reports bandwidth data for the (a+1)-th time, the node may send a bandwidth quota query request.

After receiving the bandwidth quota query request, the electronic device may obtain the latest determination result. If the determination result indicates that the current domain name bandwidth is greater than 80% (80% is the fourth preset ratio) of the quota upper limit for the target domain name, the electronic device may send to the node the bandwidth quota corresponding to the bandwidth data reported by the node for the a-th time stored in the electronic device. That is, if the current domain name bandwidth is greater than 80% of the quota upper limit for the target domain name, the electronic device may enable the speed limiting policy to limit the speed of each node under the target domain name.

In this way, the electronic device may eliminate an action of searching for the node during the time interval between the time when the node reports the bandwidth data for the a-th time and the time when the node reports the bandwidth data for the (a+1)-th time. Since the electronic device needs to continuously calculate the bandwidth quota for a large number of nodes, the efficiency of bandwidth quota allocation for a large number of nodes by the electronic device may be greatly improved.

In practical applications, the electronic device may perform a speed limitation on the domain name exceeding the fourth preset ratio of the quota upper limit, which may be used to prevent network attacks. When the network is attacked, the program invading the network could increase the real-time bandwidth in the network rapidly, and then increase the current domain name bandwidth for the target domain name rapidly. If the current domain name bandwidth exceeds the fourth preset ratio of the quota upper limit, the electronic device can automatically perform a speed limitation on the target domain name and limit the bandwidth occupied by the programs invading the network, thus achieving the purpose of preventing network attacks.

Also, in practical applications, the application of the electronic device to perform a speed limitation on the domain name exceeding the fourth preset ratio of the quota upper limit, which may also meet the needs of enterprise users, thus not only saving the cost, but also having better scalability, for example, the speed limit requirements of enterprise users in provided download services or the speed limit requirements of enterprise users in provided online video playback services.

In an embodiment of the present application, the electronic device may also calculate a minimum bandwidth quota for each node under the target domain name and send the minimum bandwidth quota to each node under the target domain name. That is to say, the method for node speed limiting according to the embodiment of the present application may further include the following steps:

determining a minimum bandwidth quota and sending it to each node under the target domain name, so that when the calculated bandwidth quota for the node is zero, the node limits the speed of each device in the node according to the minimum bandwidth quota.

> Wherein, the minimum bandwidth quota=(the quota upper limit of the target domain name−the total allocatable quota)/the total number of nodes under the target domain name.

Combining the above-mentioned manners for determining the total allocatable quota and for determining the minimum bandwidth quota, the embodiment of the present application provides another manner for determining the total allocatable quota and another manner for determining the minimum bandwidth quota, wherein:

> the minimum bandwidth quota=the quota upper limit of the target domain name*the preset value/100/ the total number of nodes under the target domain name.

> The total allocatable quota=the quota upper limit of the target domain name−the minimum bandwidth quota*the total number of nodes under the target domain name.

The preset value is any one of 0 to 100, and is not limited in the embodiment of the present application. The preset value may be determined based on the number of tasks processed by terminal devices connected to each node under the target domain name and the amount of traffic required to process these tasks in actual applications, so as to ensure that the terminal devices connected to each node under the target domain name can complete their tasks quickly and smoothly.

For example, the preset value may be 1.5, 1.2, and the like. Of course, the preset value may also be another value from 0 to 100, which are all reasonable.

In the determination of the total allocatable quota, the minimum bandwidth quota can be determined in any manner as disclosed above in the embodiments of the present application, which is not limited in the embodiment of the present application.

In practical applications, in order to ensure that the node bandwidth of each node under the target domain name is not zero, the electronic device may send to each node the minimum bandwidth quota for each node under the target domain name. Therefore, even if the bandwidth quota of a node calculated by the electronic device according to the above S102 is zero, the node can obtain one minimum bandwidth quota to ensure the basic bandwidth requirements of each device connected to the node.

Figure 2:
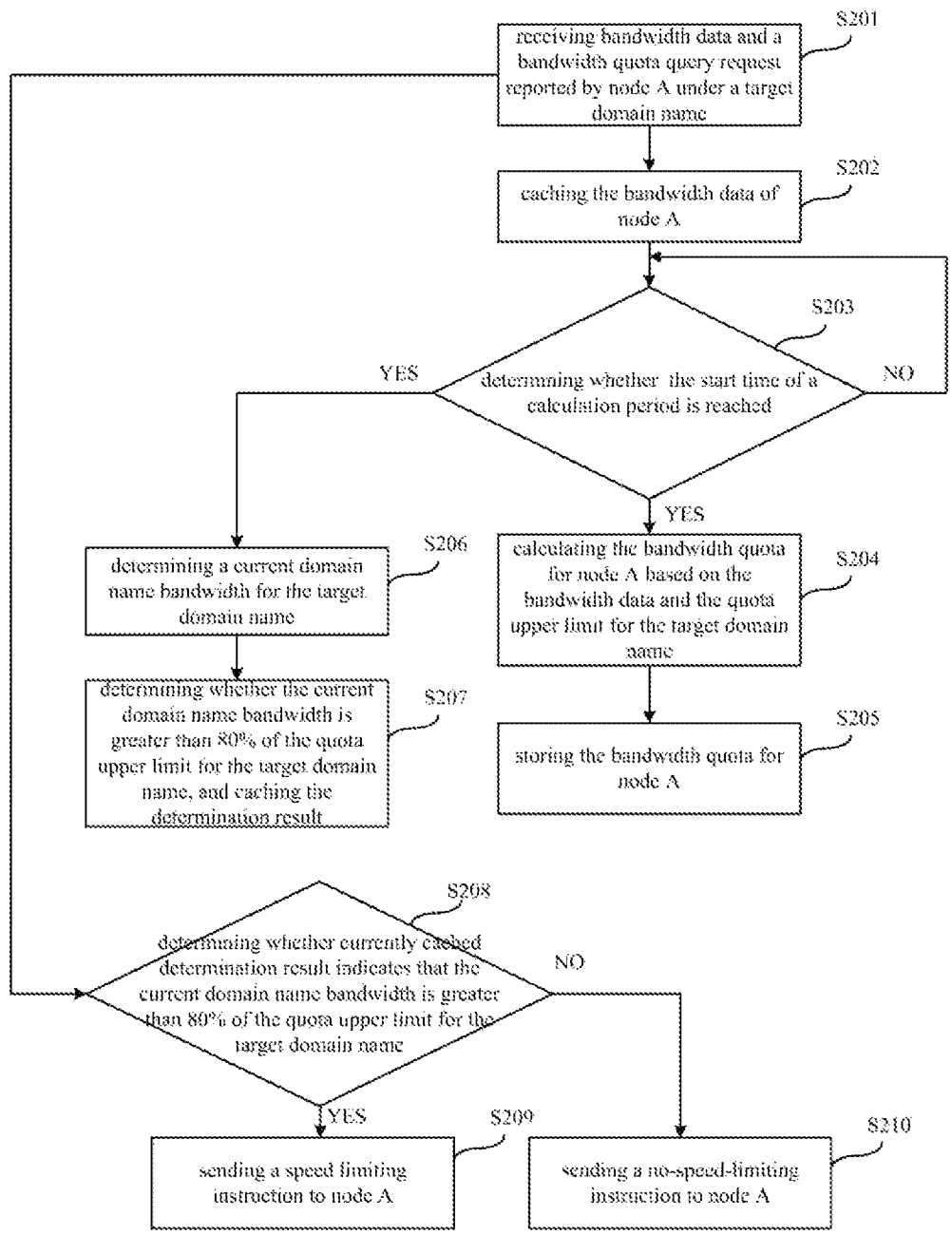
FIG. 2 is a flow chart of a method for node speed limiting according to an embodiment of the present application.

As shown in FIG. 2, an embodiment of the present application provides an example in which a node reports bandwidth data once, which may include the following steps:

S201: receiving bandwidth data and a bandwidth quota query request reported by node A under the target domain name.

Wherein, the electronic device can perform steps 202 and 208 simultaneously after performing step 201.

S202: caching the bandwidth data of node A.

S203: determining whether current time reaches the start time of a calculation period, and performing S204 and S206 if the start time of the calculation period is reached, and performing S203 if the start time of the calculation period is not reached.

The electronic device may perform S206 to S207 and S204 to S205 in each calculation period.

In FIG. 2, performing S204 and S206 in parallel is taken as an example. Correspondingly, in another embodiments, S206 may also be performed after S205.

S204: calculating the bandwidth quota for node A based on the bandwidth data and the quota upper limit for the target domain name.

S205: storing the bandwidth quota for node A.

It should be understood that if the bandwidth quota for node A exists in memory, the electronic device can update the bandwidth quota for node A to the bandwidth quota calculated this time. and if the bandwidth quota for node A does not exist in memory, the electronic device can store the bandwidth quota for node A.

S206: determining a current domain name bandwidth for the target domain name.

S207: determining whether the current domain name bandwidth is greater than 80% of the quota upper limit for the target domain name, and caching the determination result.

Where, there are two kinds of determination results that the current domain name bandwidth can meet: a. the current domain name bandwidth is greater than 80% of the quota upper limit for the target domain name; b. the current domain name bandwidth is less than or equal to 80% of the upper quota limit for the target domain name.

S208: determining whether currently cached determination result indicates that the current domain name bandwidth is greater than 80% of the quota upper limit for the target domain name, and if yes, performing S209, otherwise performing S210.

The determination result determined in S208 is the determination result cached when S207 was performed last time.

S209: sending a speed limiting instruction to node A, where the speed limiting instruction includes the currently stored bandwidth quota of node A.

When receiving the bandwidth quota query request reported by node A, the electronic device may send to node A the speed limiting instruction including the currently stored bandwidth quota of node A in response to the bandwidth quota query request after determining that the currently cached determination result indicates that the current domain name bandwidth is greater than 80% of the quota upper limit for the target domain name. That is to say, the speed limiting instruction sent to node A is a response to the bandwidth quota query request reported by node A.

Moreover, since the above-mentioned speed limiting instruction sent to node A includes the currently stored bandwidth quota of node A. That is to say, the above-mentioned currently stored bandwidth quota of node A may be sent to node A in response to the bandwidth quota query request reported by node A.

Wherein, when node A is one server, the above-mentioned currently stored bandwidth quota of the node A is sent to the server, so that the electronic device may limit the speed of the node A according to the bandwidth quota. When node A is a collection of multiple servers, the currently stored bandwidth quota of node A is allocated to each of the multiple servers under node A according to a preset allocation principle, so that electronic device may limit the speed of node A according to the currently stored bandwidth quota of node A and the bandwidth quota allocated for each of the multiple servers.

S210: sending a no-speed-limiting instruction to node A.

Where, if node A receives the no-speed-limiting instruction, node A does not limit the speed of each device under node A.

When receiving the bandwidth quota query request reported by node A, the electronic device may send to node A the no-speed-limiting instruction in response to the bandwidth quota query request after determining that the currently cached determination result indicates that the current domain name bandwidth is not greater than 80% of the quota upper limit for the target domain name. That is to say, the no-speed-limiting instruction sent to node A is a response to the bandwidth quota query request reported by node A.

Figure 3:
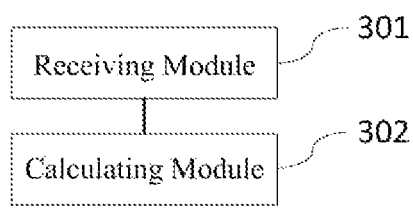
FIG. 3 is a schematic structural diagram of an apparatus for node speed limiting according to an embodiment of the present application.

Based on the same technical concept, an embodiment of the present application further provides an apparatus for node speed limiting. As shown in FIG. 3, the apparatus includes: a receiving module 301 and a calculating module 302;

the receiving module 301 is configured for receiving bandwidth data reported by a node under a target domain name, wherein the bandwidth data includes the number of node connections and a node bandwidth, and the number of node connections is the number of connected devices in the node;

the calculating module 302 is configured for calculating a bandwidth quota for the node based on the bandwidth data and a quota upper limit for the target domain name, wherein the bandwidth quota is the maximum available bandwidth of the node after a speed limiting policy is enabled.

In an embodiment of the present application, the calculating module 302 is specifically configured for:

determining a total allocatable quota, wherein the total allocatable quota is the product of the quota upper limit for the target domain name and a first preset ratio;

calculating the bandwidth quota for the node based on the total allocatable quota and the bandwidth data, wherein the bandwidth quota=the total allocatable quota*(a second preset ratio*the number of node connections/the total number of node connections under the target domain name+a third preset ratio*the node bandwidth/the total bandwidth of nodes under the target domain name), the total number of node connections under the target domain name is the sum of the number of devices connected by all nodes under the target domain name, and the total bandwidth of the nodes under the target domain name is the sum of the bandwidth for all nodes under the target domain name.

In an embodiment of the present application, the apparatus further includes an updating module;

the updating module is configured for updating the bandwidth quota for the node to the bandwidth quota obtained by this calculation if the bandwidth quota for the node exists in the memory of a central server; or, the updating module is configured for storing the bandwidth quota for the node if the bandwidth quota for the node does not exist in the memory of the central server, and the central server is configured for managing each node under the target domain name.

In an embodiment of the present application, the apparatus further includes a determining module;

the determining module is configured for determining a current domain name bandwidth for the target domain name once every a preset period, and determining whether the current domain name bandwidth is greater than a fourth preset ratio of the quota upper limit for the target domain name.

In an embodiment of the present application, the apparatus further includes an obtaining module and a sending module;

the obtaining module is configured for, when receiving a bandwidth quota query request sent by the node, obtaining the latest determination result of determining whether the current domain name bandwidth is greater than the fourth preset ratio of the quota upper limit for the target domain name;

the sending module is configured for sending a bandwidth quota query response to the node if the determination result indicates that the current domain name bandwidth is greater than the fourth preset ratio of the quota upper limit for the target domain name, wherein the bandwidth quota query response includes the currently stored bandwidth quota for the node.

In an embodiment of the present application, the apparatus further includes an allocating module;

the calculating module 302 is further configured for determining a minimum bandwidth quota, wherein the minimum bandwidth quota=(the quota upper limit of the target domain name− the total allocatable quota)/the total number of nodes under the target domain name.

The allocating module is configured for sending the minimum bandwidth quota to each node under the target domain name, so that when the bandwidth quota for the node is zero, the node limits the speed of each device in the node according to the minimum bandwidth quota.

With the solution according to the embodiment of the present application, the electronic device can receive the bandwidth data reported by a node under a target domain name, and calculate the bandwidth quota for the node based on the bandwidth data and a quota upper limit for the target domain name. In this way, since different nodes have different bandwidth data, the electronic device can calculate the bandwidth quota for each node separately for each node based on the bandwidth data of each node under the target domain name. Therefore, the bandwidth quota for each node calculated by the electronic device can accurately match the bandwidth condition of each node, so that the electronic device can more accurately allocate the bandwidth quota to each node under the target domain name.

Figure 4:
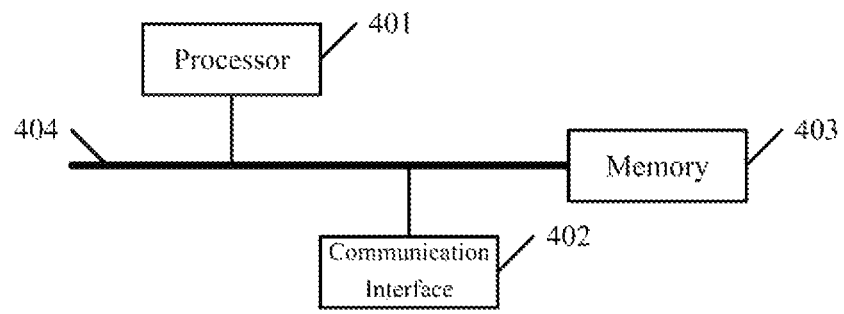
FIG. 4 is a schematic structural diagram of an electronic device according to an embodiment of the present application.

The embodiment of the present application further provides an electronic device, as shown in FIG. 4, which includes a processor 401, a communication interface 402, a memory 403 and a communication bus 404, wherein the processor 401, the communication interface 402 and the memory 403 are communicated with each other through the communication bus 404, the memory 403 is configured for storing a computer program;

the processor 401, when configured for executing the program stored in the memory 403, so as to perform the following steps:

receiving bandwidth data reported by a node under a target domain name, wherein the bandwidth data includes the number of node connections and a node bandwidth, and the number of node connections is the number of connected devices in the node;

calculating a bandwidth quota for the node based on the bandwidth data and a quota upper limit for the target domain name, wherein the bandwidth quota is the maximum available bandwidth of the node after a speed limiting policy is enabled.

It should be noted that when the processor 401 is configured to execute the program stored in the memory 403, so as to perform other steps described in the above method embodiments, which may be referred to the relevant descriptions in the above method embodiments and will not be repeated in detail here.

The communication bus involved in the above-mentioned network device may be a Peripheral Component Interconnect (PCI) bus or an Extended Industry Standard Architecture (EISA) bus and the like. The communication bus may be divided into address bus, data bus, control bus and the like. For ease of representation, only one thick line is shown in the drawing, but it does not mean that there is only one bus or one type of bus.

The communication interface is configured for communication between the above-mentioned network device and other devices.

The memory may include Random Access Memory (RAM) or Non-Volatile Memory (NVM), such as at least one disk memory. In an embodiment of the present application, the memory may also be at least one storage device located far away from the above-mentioned processor.

The above-mentioned processor may be a general-purpose processor, including a Central Processing Unit (CPU), a Network Processor (NP), and the like. It may also be a Digital Signal Processing (DSP), an Application Specific Integrated Circuit (ASIC), a Field-Programmable Gate Array (FPGA) or other programmable logic devices, discrete gates or transistor logic devices, and discrete hardware components.

Based on the same technical concept, an embodiment of the present application further provides a computer-readable storage medium having stored thereon a computer program which, when executed by a processor, causes the processor to perform the method for node speed limiting.

Based on the same technical concept, the embodiment of the present application further provides a computer program product including instructions which, when executed on a computer, causes the computer to perform the method for node speed limiting.

Based on the same technical concept, an embodiment of the present application further provides a computer program which, when executed on a computer, causes the computer to perform the method for node speed limiting.

In the above-mentioned embodiments, it may be implemented in whole or in part by software, hardware, firmware or any combination thereof. When implemented in software, it may be implemented in whole or in part in the form of a computer program product. The computer program product includes one or more computer instructions. When the computer program instructions are loaded and executed on a computer, the flows or functions according to the embodiment of the present application are generated in whole or in part. The computer may be a general purpose computer, a special purpose computer, a computer network, or other programmable devices. The computer instructions may be stored in a computer-readable storage medium or transmitted from one computer-readable storage medium to another. For example, the computer instructions may be transmitted from one website, computer, server or data center to another via wired (such as coaxial cable, optical fiber, digital subscriber line (DSL)) or wireless (such as infrared, wireless, microwave). The computer-readable storage medium may be any available medium that may be accessed by a computer, or a data storage device containing servers or data centers integrated by one or more available media. The available media may be a magnetic media (e.g., a floppy disk, a hard disk, a magnetic tape), an optical media (e.g., DVD), or a semiconductor media (e.g., a Solid State Disk (SSD)).

It should be noted that the relationship terms used herein such as "first", "second" are only for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a . . . " or "include(s) a . . . " do not exclude that there are other identical elements in the processes, methods, articles, or devices which include these elements.

All the embodiments are described in corresponding ways, same or similar parts in each of the embodiments can be referred to one another, and the parts emphasized are differences to other embodiments. In particular, the embodiment of the apparatus is described briefly since it is substantially similar to the method embodiment, and the related parts can be referred to the corresponding description of the method embodiment.

The embodiments described above are simply preferable embodiments of the present application, and are not intended to limit the present application. Any modifications, alternatives, improvements, or the like within the spirit and principle of the present application shall be included within the scope of protection of the present application.

INDUSTRIAL APPLICABILITY

The method, apparatus for node speed limiting, electronic device and storage medium according to the embodiments of the present application can calculate the bandwidth quota for the node separately for each node based on the bandwidth data of each node under the target domain name. Therefore, there is no need to set a fixed bandwidth quota for each node, which avoids the situation that the bandwidth quota set by each node is not applicable to the bandwidth condition for this node, and can improve the accuracy of the bandwidth quota allocation of each node under the target domain name.

What is claimed is:

1. A method for node speed limiting, which is applied to a Content Delivery Network central server, wherein the Content Delivery Network central server manages multiple domain names, and there is at least one node under each domain name, each node being a server or a collection of multiple servers, the server(s) in each node being connected to at least one terminal device, the method comprising:

receiving bandwidth data reported by a node under a target domain name, wherein the bandwidth data comprises a number of node connections and a node bandwidth, and the number of node connections is the number of connected devices in the node, wherein the number of connected devices in the node is a number of terminal devices connected to a server included in the node, and the node bandwidth is sum of bandwidth used by nodes and devices in the nodes;

calculating a bandwidth quota for the node based on the bandwidth data and a quota upper limit for the target domain name, wherein the bandwidth quota is a maximum available bandwidth of the node after a speed limiting policy is enabled, wherein calculating the bandwidth quota for the node based on the bandwidth data and the quota upper limit for the target domain name comprises:

determining a total allocatable quota, wherein the total allocatable quota is a product of the quota upper limit for the target domain name and a first preset ratio;

calculating the bandwidth quota for the node based on the total allocatable quota and the bandwidth data, or, determining the total allocatable quota and calculate average bandwidth quota for the node based on the total allocatable quota as the bandwidth quota for the node, wherein the average bandwidth quota=the total allocatable quota/a total number of nodes under the target domain name.

2. The method according to claim 1, wherein the bandwidth quota=the total allocatable quota*(a second preset ratio*the number of node connections/a total number of node connections under the target domain name+a third preset ratio*the node bandwidth/a total bandwidth of nodes under the target domain name), and the total number of node connections under the target domain name is a sum of the number of devices connected by all nodes under the target domain name, and the total bandwidth of the nodes under the target domain name is a sum of the bandwidth for all the nodes under the target domain name.

3. The method according to claim 2, wherein the method further comprises:

determining a minimum bandwidth quota, wherein the minimum bandwidth quota=(the quota upper limit of the target domain name−the total allocatable quota)/the total number of nodes under the target domain name;

sending the minimum bandwidth quota to each node under the target domain name, so that when the bandwidth quota for the node is zero, the node limits a speed of each device in the node according to the minimum bandwidth quota.

4. The method according to claim 1, wherein after calculating the bandwidth quota for the node based on the bandwidth data and the quota upper limit for the target domain name, the method further comprises:

updating the bandwidth quota for the node to the bandwidth quota obtained by this calculation if the bandwidth quota for the node exists in a memory of a central server; or, storing the bandwidth quota for the node if the bandwidth quota for the node does not exist in the memory of the central server;

wherein, the central server is configured for managing each node under the target domain name.

5. The method according to claim 4, wherein the method further comprises:

determining a current domain name bandwidth for the target domain name once every a preset period, and determining whether the current domain name bandwidth is greater than a fourth preset ratio of the quota upper limit for the target domain name.

6. The method according to claim 5, wherein the method further comprises:

when receiving a bandwidth quota query request sent by the node, obtaining a latest determination result of determining whether the current domain name bandwidth is greater than the fourth preset ratio of the quota upper limit for the target domain name;

sending a bandwidth quota query response to the node if the determination result indicates that the current domain name bandwidth is greater than the fourth preset ratio of the quota upper limit for the target domain name, wherein the bandwidth quota query response comprises the currently stored bandwidth quota for the node.

7. An electronic device, which is a Content Delivery Network central server, wherein the Content Delivery Network central server manages multiple domain names, and there is at least one node under each domain name, each node being a server or a collection of multiple servers, the server(s) in each node being connected to at least one terminal device, the electronic device comprising a processor, a communication interface, a memory and a communication bus, wherein the processor, the communication interface and the memory are communicated with each other through the communication bus;

the memory is configured for storing a computer program;

the processor is configured for implementing operations comprising the following steps when executing the program stored in the memory:

receiving bandwidth data reported by a node under a target domain name, wherein the bandwidth data comprises a number of node connections and a node bandwidth, and the number of node connections is the number of connected devices in the node, wherein the number of connected devices in the node is a number of terminal devices connected to a server included in the node, and the node bandwidth is sum of bandwidth used by nodes and devices in the nodes;

calculating a bandwidth quota for the node based on the bandwidth data and a quota upper limit for the target domain name, wherein the bandwidth quota is a maximum available bandwidth of the node after a speed limiting policy is enabled, wherein calculating the bandwidth quota for the node based on the bandwidth data and the quota upper limit for the target domain name comprises:

determining a total allocatable quota, wherein the total allocatable quota is a product of the quota upper limit for the target domain name and a first preset ratio;

calculating the bandwidth quota for the node based on the total allocatable quota and the bandwidth data, or, determining the total allocatable quota and calculate average bandwidth quota for the node based on the total allocatable quota as the bandwidth quota for the node, wherein the average bandwidth quota=the total allocatable quota/a total number of nodes under the target domain name.

8. The electronic device according to claim 7,
wherein the bandwidth quota=the total allocatable quota*(a second preset ratio*the number of node connections/a total number of node connections under the target domain name+a third preset ratio*the node bandwidth/a total bandwidth of nodes under the target domain name), and the total number of node connections under the target domain name is a sum of the number of devices connected by all nodes under the target domain name, and the total bandwidth of the nodes under the target domain name is a sum of the bandwidth for all the nodes under the target domain name.

9. The electronic device according to claim 8, wherein the operations further comprise:
determining a minimum bandwidth quota, wherein the minimum bandwidth quota=(the quota upper limit of the target domain name−the total allocatable quota)/the total number of nodes under the target domain name;
sending the minimum bandwidth quota to each node under the target domain name, so that when the bandwidth quota for the node is zero, the node limits a speed of each device in the node according to the minimum bandwidth quota.

10. The electronic device according to claim 7, wherein after calculating the bandwidth quota for the node based on the bandwidth data and the quota upper limit for the target domain name, the operations further comprise:
updating the bandwidth quota for the node to the bandwidth quota obtained by this calculation if the bandwidth quota for the node exists in a memory of a central server; or,
storing the bandwidth quota for the node if the bandwidth quota for the node does not exist in the memory of the central server;
wherein, the central server is configured for managing each node under the target domain name.

11. The electronic device according to claim 10, wherein the operations further comprise:
determining a current domain name bandwidth for the target domain name once every a preset period, and determining whether the current domain name bandwidth is greater than a fourth preset ratio of the quota upper limit for the target domain name.

12. The electronic device according to claim 11, wherein the operations further comprise:
when receiving a bandwidth quota query request sent by the node, obtaining a latest determination result of determining whether the current domain name bandwidth is greater than the fourth preset ratio of the quota upper limit for the target domain name;
sending a bandwidth quota query response to the node if the determination result indicates that the current domain name bandwidth is greater than the fourth preset ratio of the quota upper limit for the target domain name, wherein the bandwidth quota query response comprises the currently stored bandwidth quota for the node.

13. A non-transitory computer-readable storage medium having stored thereon a computer program which, when executed by a processor, causes the processor to perform operations which is applied to a Content Delivery Network central server, wherein the Content Delivery Network central server manages multiple domain names, and there is at least one node under each domain name, each node being a server or a collection of multiple servers, the server(s) in each node being connected to at least one terminal device, the operations comprising:
receiving bandwidth data reported by a node under a target domain name, wherein the bandwidth data comprises a number of node connections and a node bandwidth, and the number of node connections is the number of connected devices in the node, wherein the number of connected devices in the node is a number of terminal devices connected to a server included in the node, and the node bandwidth is sum of bandwidth used by nodes and devices in the nodes;
calculating a bandwidth quota for the node based on the bandwidth data and a quota upper limit for the target domain name, wherein the bandwidth quota is a maximum available bandwidth of the node after a speed limiting policy is enabled,
wherein calculating the bandwidth quota for the node based on the bandwidth data and the quota upper limit for the target domain name comprises:
determining a total allocatable quota, wherein the total allocatable quota is a product of the quota upper limit for the target domain name and a first preset ratio;
calculating the bandwidth quota for the node based on the total allocatable quota and the bandwidth data, or,
determining the total allocatable quota and calculate average bandwidth quota for the node based on the total allocatable quota as the bandwidth quota for the node, wherein the average bandwidth quota=the total allocatable quota/a total number of nodes under the target domain name.

* * * * *